(No Model.) 3 Sheets—Sheet 2.
G. J. KINEMANN & J. DE ZAMORA.
REVOLVING TRAPEZE.
No. 567,543. Patented Sept. 8, 1896.
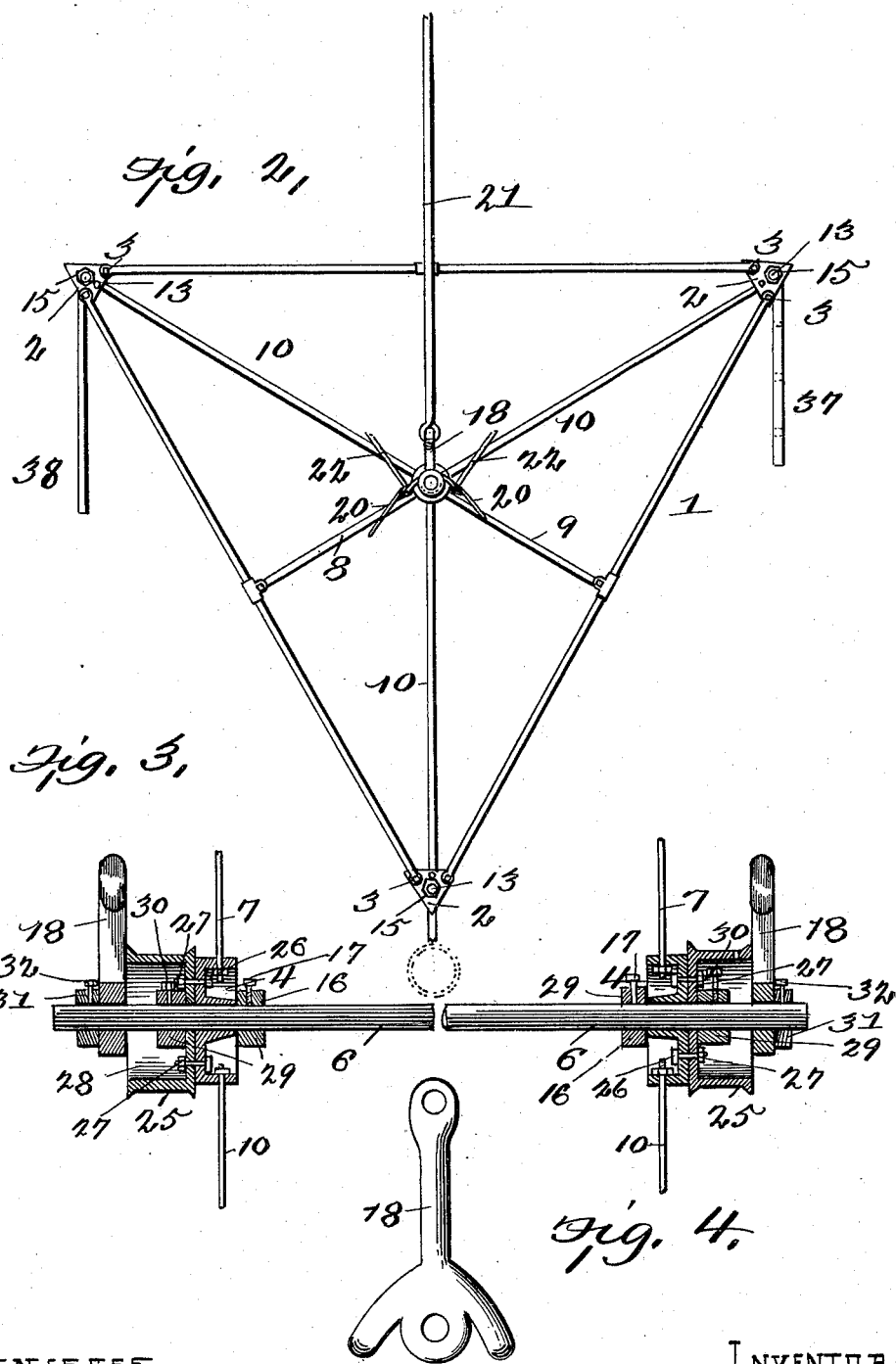

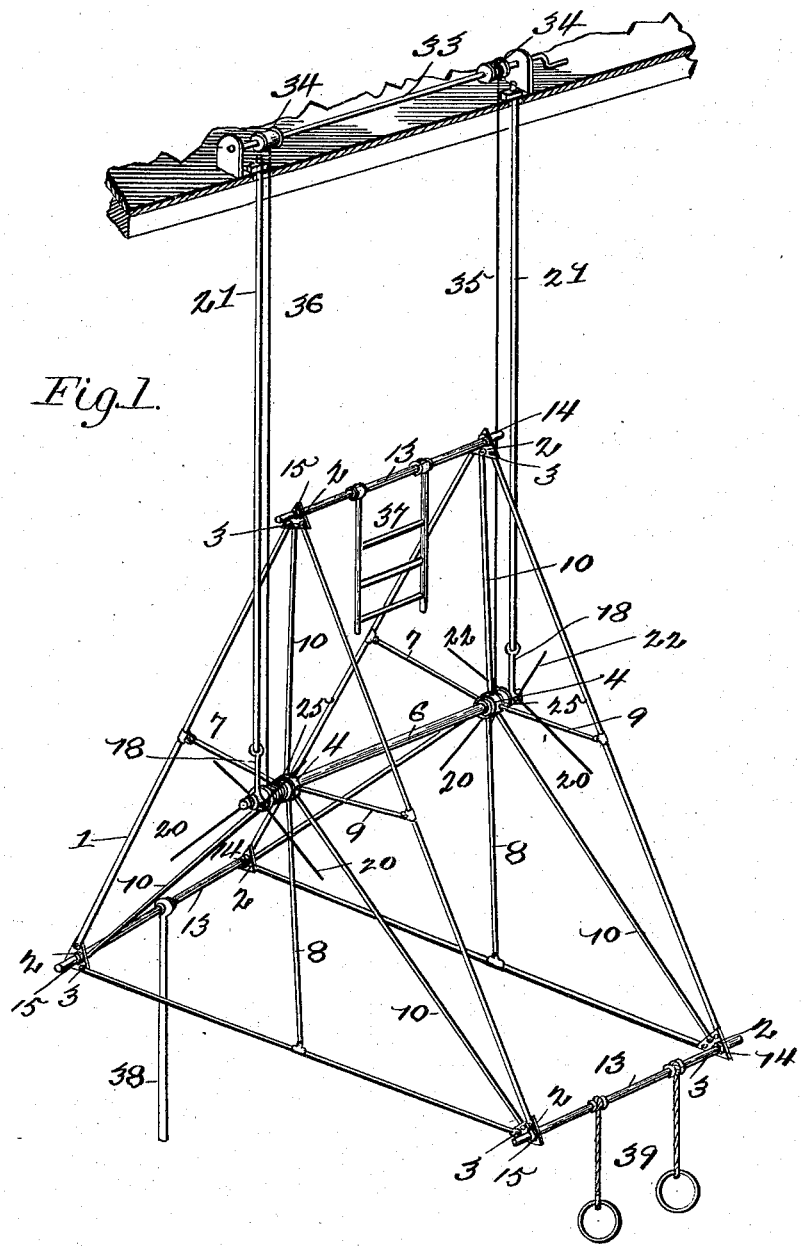

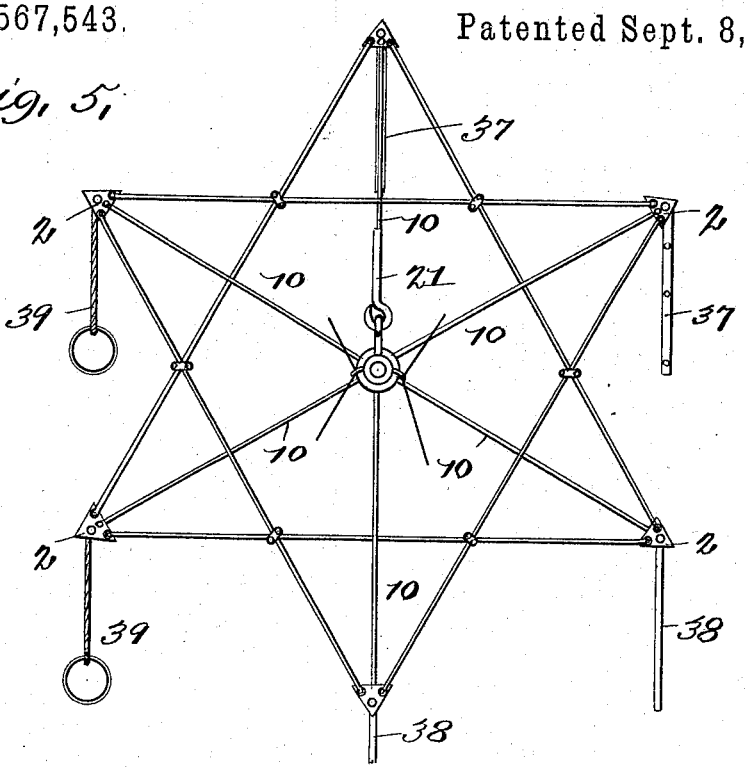
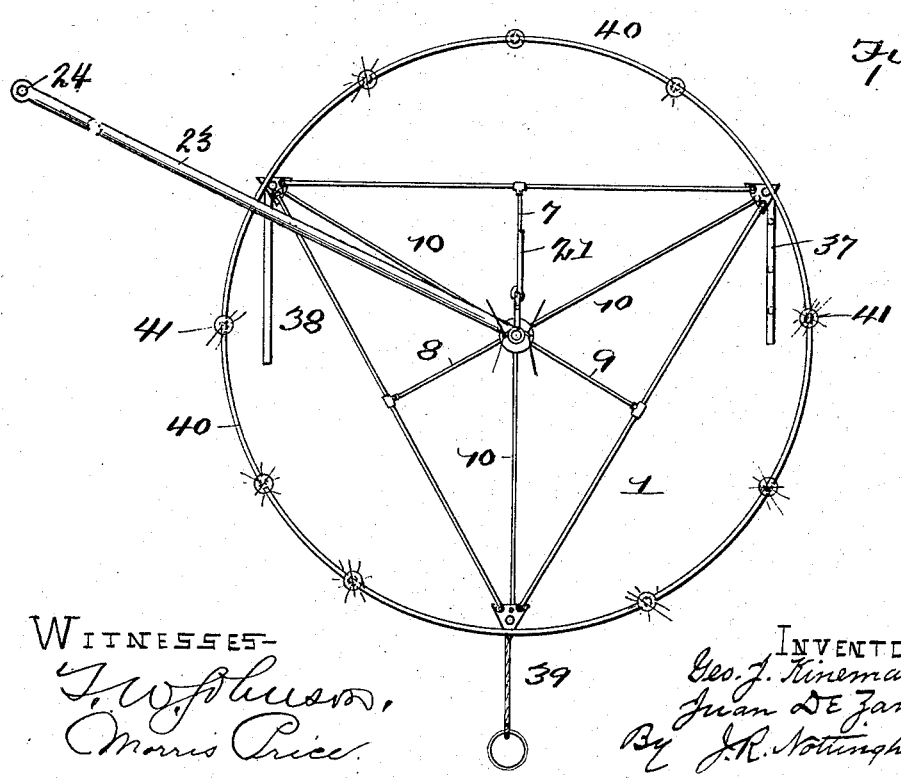

UNITED STATES PATENT OFFICE.

GEORGE J. KINEMANN, OF SAN FRANCISCO, CALIFORNIA, AND JUAN DE ZAMORA, OF CHICAGO, ILLINOIS.

REVOLVING TRAPEZE.

SPECIFICATION forming part of Letters Patent No. 567,543, dated September 8, 1896.

Application filed October 8, 1895. Serial No. 565,071. (No model.)

*To all whom it may concern:*

Be it known that we, GEORGE J. KINEMANN, residing at San Francisco, in the county of San Francisco and State of California, and JUAN DE ZAMORA, residing at Chicago, in the county of Cook and State of Illinois, citizens of the United States, have invented certain new and useful Improvements in Revolving Triangles; and we do hereby declare the following to be a full, clear, and exact description of the invention, such as will enable others skilled in the art to which it appertains to make and use the same.

The invention relates to certain improvements in aerial gymnastic apparatus designated as "revolving triangles;" and it consists of a triangular frame centrally journaled in elevated bearings and carrying three or more devices upon which three or more performers may perform acrobatic feats while the triangular frame is being revolved; and the invention further consists of certain novel mechanism for revolving said frame, as will be hereinafter more fully explained, and specifically set forth in the claims.

The principal object of the invention is to produce an aerial apparatus for use in theaters, circus-tents, &c., upon which feats of an acrobatic or gymnastic character may be performed, and which will present a pleasing diversion for an audience, and at the same time afford speculation as to its mode of operation.

Another object of the invention is to provide for the ready adjustment of the sides of the triangular frame, whereby any desired width of frame may be had.

Still another object of the invention is to so construct the various parts of the frame, its supports, and operating mechanism that it can be readily and quickly put together and in place and taken down and apart.

These objects are attained by means of the mechanism illustrated in the accompanying drawings, in which—

Figure 1 is a perspective view of our improved revolving triangle carrying devices for three performers; Fig. 2, a side elevation of the same; Fig. 3, a longitudinal vertical sectional view of the hubs and the other attachments mounted on the central shaft; Fig. 4, an enlarged side view of one of the stay-irons; Fig. 5, a side elevation of a double triangle, showing the frame adapted to six performers; and Fig. 6, a side elevation of a modified form of the single triangular frame.

Referring to the drawings, the numeral 1 indicates the respective sides of the frame, said sides being a perfect triangle and composed of three rods fastened together at the angles by triangular plates 2, which are bored to receive securing-bolts 3 for the purpose of securing the ends of the rods to the triangular plates, said ends being provided with eyes for the reception of said bolts. Each triangular side is provided with a hub 4, which has an annular groove made in its inner face and is bored centrally to receive a shaft 6, upon which the triangular frame revolves. Each side is firmly braced by rods 7, 8, and 9, which extend from the center of the rods forming the sides to the hub, and by rods 10, which extend from said hub to the angular fastening-plates. The outer ends of the brace-rods 7, 8, and 9 are connected to the rods forming the triangular sides by means of clips, which encircle said rods and are bolted to the ends of the brace-rods, as shown. The other ends of said rods are screw-threaded and are received in holes made in the outer periphery of the hub and are secured by nuts and jam-nuts. The outer end of each brace-rod 10 is secured to the triangular plate in a manner similar to the ends of the rods forming the triangular sides, the other end of said rod being secured to the hub similar to rods 7, 8, and 9. The triangular sides are connected together at the angles by cross tie-rods 13, the ends of which are screw-threaded and pass through holes in the triangular plates 2, and jam-nuts 14 and securing-nuts 15 are employed to secure said sides firmly together at any desired width. The hubs are loosely mounted on the axle 6 and are prevented from inward movement by collars 16, secured by binding-screws 17. As thus constructed the width of the frame is capable of adjustment.

The numeral 18 indicates a stay-iron which is mounted on each end of the central shaft and provided with three arms, two of which have their ends provided with closed loops, to which are secured guy-wires 20 for retaining the shaft in proper rigid position. The other arm of the stay-iron serves as a connection for one end of the supporting-rod 21, the other end of said rod generally passing up through the ceiling of the building and being secured in any suitable manner. Guy-wires 22 may be employed to further brace and stay the shaft. In some instances it may be necessary to support the shaft, as shown in Fig. 6, wherein the shaft is supported in the ends of arms 23, which project from a bar 24, secured in any suitable manner at the front of the upper part of the stage, it being understood that the apparatus is supported at some distance outward from the stage. The mechanism for revolving the triangle is of such a character that it is not perceived by the audience, and it consists of two spools 25, one on each end of the shaft 6, situated between the hub and stay-iron. Each spool is secured to a hub by means of bolts 26, which project through the spool and are provided with securing-nuts 27, the outer faces of said spools being formed with an annular recess 28 for receiving the securing-nuts and also for the purpose of rendering the spools less weighty and for obtaining a more rigid connection with the hub by lessening the thickness of material through which the securing-bolts pass. Outward movement of both the hub and spool is prevented by collars 29, which are secured on the shaft by binding-screws 30, and each stay-iron is secured against displacement by collar 31 and binding-screw 32.

Supported in suitable bearings above the ceiling, or in the loft above the stage, completely concealed from view, is a windlass 33, provided with two drums 34, upon one of which is wound a number of coils of wire 35, one end of which is secured to said drum and the other end to one of the spools 25. Upon the other spool is wound a number of coils of wire 36, one end of which is securely fastened to said spool and the other end to the other drum of the windlass. To revolve the triangle, it is only necessary to turn the crank-handle of the windlass, which operation unwinds the coils of wire on the spool and winds it upon the drum of the windlass. In the meantime the coil of wire wound on the drum is unwinding and being wound on the other spool, so that when the first spool is freed of its coils the other is wound with coils of wire to continue the operation of revolving the triangle. Thus each spool and its companion drum serve alternately in the operation of revolving said triangle.

While we have shown and described a driving mechanism located at both ends of the shaft, it will be evident that such mechanism may be effectively employed at one end only, and therefore we do not wish to be understood as limiting ourselves to driving mechanism at both ends of said shaft.

The numeral 37 indicates a ladder, 38 a pole, and 39 a pair of rings, each of which devices is suspended from a cross tie-rod in such a manner that its normal position is always vertical. Each device is intended for a performer, but when it is desired to have six performers the double triangular frame is employed and each ladder, pole, and pair of rings may be duplicated.

As shown in Fig. 6, each triangular frame is encircled by a rim 40, which supports a number of incandescent electric lamps 41, which may be of various colors, so as to give out rays of brilliant and different hues. Other lamps may be attached to each end of each cross tie-rod to enhance the attractive and pleasing effect of the revolving triangle.

Various modifications of our invention may be made without departing from the spirit of the invention or sacrificing the principle thereof, such, for instance, as constructing the revoluble frame for four performers instead of three or six, which is accomplished by simply joining two triangles at either side in the shape of a diamond, and changing the location of the hubs accordingly.

Having thus fully described our invention, what we claim as new, and desire to secure by Letters Patent, is—

1. In an aerial gymnastic apparatus, the combination with a stationary shaft suitably supported, of a revoluble frame having triangular sides adjustably connected together by tie-rods; collars and binding-screws by means of which the width of the frame can be adjusted on the shaft, and one or more ladders, poles or pairs of rings loosely suspended from a tie-rod at each angle of the frame, substantially as specified.

2. The combination, with a frame centrally journaled on a stationary shaft mounted in suitable supports, of a spool keyed or fastened to one of the hubs of the frame, a coil of wire having one end secured to said spool, and a windlass for unwinding said wire from the spool to revolve the frame, substantially as specified.

3. The combination, with a frame centrally journaled on a stationary shaft mounted in suitable supports, of a spool rigidly fastened to one of the hubs of the frame, a coil of wire having one end secured to said spool, a windlass for unwinding said wire from the spool to revolve said frame, a ladder, a pole, and a pair of rings suspended from the tie-rods of the frame, substantially as specified.

4. The combination, with a frame centrally journaled on a stationary shaft mounted in suitable supports, of a spool mounted on each end of the shaft and rigidly secured to the hub of the frame, two coils of wire, each coil having one end connected to a spool, and a windlass arranged to alternately wind and unwind the coils of wire to continuously revolve said frame, substantially as specified.

5. In an aerial gymnastic apparatus, a revoluble frame consisting of two skeleton triangular sides, each side connected together at their respective angles by triangular plates and provided with a hub centrally supported by braces connected to the respective sides and angles of said triangular sides, and cross tie-rods adjustably connecting the sides together, substantially as specified.

6. The combination, with the triangular sides, each joined together by triangular plates and provided with a hub centrally supported by suitable braces, cross tie-rods adjustably connecting the two sides together and carrying a ladder, a pole, and a pair of rings loosely suspended therefrom, of a stationary shaft passing through the hubs and mounted in suitable supports, means for adjusting the width of the frame and for preventing lateral movement on the shaft, substantially as specified.

7. The combination, with the triangular side pieces connected together by triangular plates and each having a hub centrally supported by suitable braces and tie-rods connecting said triangular sides together, of a stationary shaft mounted in suitable supports, a spool fastened to one end of the hub, a coil of wire having one end fastened to the spool, a windlass for unwinding said wire from said spool, a ladder, a pole, and a pair of rings suspended from the tie-rods, substantially as specified.

In testimony whereof we affix our signatures in the presence of two witnesses.

GEORGE J. KINEMANN.
JUAN DE ZAMORA.

Witnesses:
J. R. NOTTINGHAM,
SAMUEL S. BOGGS.